(12) United States Patent
Gilgur et al.

(10) Patent No.: US 7,788,127 B1
(45) Date of Patent: Aug. 31, 2010

(54) FORECAST MODEL QUALITY INDEX FOR COMPUTER STORAGE CAPACITY PLANNING

(75) Inventors: Alexander Gilgur, Sunnyvale, CA (US); Michael F. Perka, Mountain View, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 512 days.

(21) Appl. No.: 11/823,111

(22) Filed: Jun. 25, 2007

Related U.S. Application Data

(60) Provisional application No. 60/945,546, filed on Jun. 21, 2007, provisional application No. 60/805,728, filed on Jun. 23, 2006, provisional application No. 60/805,729, filed on Jun. 23, 2006.

(51) Int. Cl.
*G06F 17/50* (2006.01)

(52) U.S. Cl. ........................................ 705/10

(58) Field of Classification Search ............... 705/7, 705/10
See application file for complete search history.

(56) References Cited

U.S. PATENT DOCUMENTS

| | | |
|---|---|---|
| 7,058,708 B2 | 6/2006 | Gold et al. |
| 2002/0169657 A1 | 11/2002 | Singh et al. |
| 2002/0174005 A1 | 11/2002 | Chappel |
| 2002/0194326 A1 | 12/2002 | Gold et al. |
| 2003/0154271 A1 | 8/2003 | Baldwin et al. |
| 2003/0158772 A1 | 8/2003 | Harris |
| 2005/0055603 A1 | 3/2005 | Soran et al. |
| 2005/0102175 A1 * | 5/2005 | Dudat et al. ............... 705/10 |
| 2005/0259683 A1 | 11/2005 | Bishop et al. |
| 2008/0256099 A1 * | 10/2008 | Chodorov et al. ......... 707/100 |

OTHER PUBLICATIONS

Gardner Jr; Exponential Smoothing: The State of the Art; 1985; Journal of Forecasting, vol. 4, 28 pages.*
International Search Report and Written Opinion, PCT Application No. PCT/US08/54802, Jun. 27, 2008, 8 pages.
International Search Report from PCT/US07/03555, Feb. 9, 2007, 7 pages.
Horizon UI Release 1 GUI External Functional Spec Revision: 1.10, Oct. 4, 2005, pp. 1-56, Monosphere, U.S.A.
*Storage Horizon*™ Systematic Capacity Planning Agent-less software solution to optimally manage and plan storage growth, Product Brochure, 2004, 4 pages, Monosphere, U.S.A.
Systematic Storage Capacity Planning The Case for an Ongoing Strategic Planning Process, White Paper, 2005, pp. 1-10, Monosphere, U.S.A.
Storage Horizon™ User's Guide Version 2.1, 2005, pp. 1-88, Monosphere, U.S.A.

* cited by examiner

*Primary Examiner*—Thomas Dixon
(74) *Attorney, Agent, or Firm*—Knobbe Martens Olson & Bear LLP.

(57) ABSTRACT

A robust, simple, application-specific way to evaluate data models and forecasts is provided for evaluating whether a forecast is trustworthy. An approach for formulating a single, summary indication of data/model/forecast quality relevant for the task at hand is described. This approach includes generating a forecast model from collected data, combining multiple model-quality parameters based on the model, computing an indication based on the combination of parameters, and evaluating the model and forecast quality based on the indication. This indication, in the form of a Model Quality Index, can also be used to compare different types of models produced by different types of analysis approaches.

22 Claims, 2 Drawing Sheets

FORECAST MODEL QUALITY INDEX FOR COMPUTER STORAGE CAPACITY PLANNING

CROSS-REFERENCE TO RELATED APPLICATIONS

This application claims the benefit of U.S. provisional applications 60/805,728, filed on Jun. 23, 2006; 60/805,729, filed on Jun. 23, 2006; and 60/945,546, filed on Jun. 21, 2007. Each of the above applications is incorporated by reference herein in its entirety.

This application is also related to U.S. patent application Ser. No. 11/823,108, titled "Data Pattern Analysis," filed on Jun. 25, 2007, and incorporated by reference herein in its entirety.

BACKGROUND

1. Field of the Invention

The present invention pertains in general to modeling and forecasting of data. In particular, the present invention is directed to evaluating the quality of models designed to forecast data usage and storage requirements.

2. Background of the Invention

A conventional approach to statistical modeling and forecasting is to use a variety of statistics to evaluate model quality and to pick the one statistic that best serves the purposes of the forecaster or data analyst. In other words, the quality and usability of the model is literally in the eyes of the beholder.

This manual, ad-hoc and potentially biased approach ignores the possibility that while some parameters may indicate that a particular model is adequate, another group of parameters may indicate the opposite. Analysts utilizing such models must be aware of possible pitfalls, while at the same time they avoid spending too much of their time determining what the model quality parameters indicate. For example, a model may have found the best-fitted trend, but if it was based on a sample of data that was too small to make any reasonable decisions regarding a trend then the model is inadequate, even if the trend explains most of the variation in the data.

In addition, not only is the conventional approach often confusing, it also may be dangerous in situations where a misleading model/forecast criterion is used. For example, analysts and end users of models and forecasts may make financial decisions based on forecasts, and a misunderstood combination of criteria may drive the decision-maker in the wrong direction.

A conventional approach requires a skilled user to interpret varying data output from a modeling program. Such an approach is not useable by someone not skilled in statistics and modeling. Also, no single parameter can be used to realistically compare various models. While some modeling and forecasting tools, such as BFS ForecastPro or Autobox, execute an automatic selection of models, these tools do not consistently provide or enforce a multiple-parameter quantitative judgment of model quality or relevance.

Some modeling tools on the market iteratively apply a variety of models, such as Exponential Smoothing, Curve-Fitting, or ARIMA (i.e. Box-Jenkins), and pick one that fits best, but this is done based on only one parameter, which is not necessarily the most relevant one, causing the model to be suboptimal. Further, the analyst has a variety of model parameters to tune the model with and a variety of model statistics to judge the quality of the tuning, which creates potential problems, as the analyst now has to judge each of the model parameters and decide what they mean in each particular case. There is no clear best model statistic. For example, statisticians Makridakis and Wheelwright have been conducting the so-called M-competitions of forecasting models and software vendors on large numbers of scenarios since 1982. The latest M-competition (M3) used only four of the possible model quality statistics to judge models, which, while important, are not the only statistics that could be used. Besides that, the M3 competition used these statistics as four separate competition categories, with winners in each category not necessarily being winners in other categories.

When there is a way to recalculate the model with different values for the model controls, several model quality indicators may be examined in order to decide which of the controls may be tuned in order to improve the model and/or forecast quality. That, however, requires a person sufficiently skilled in statistics to make such decisions and sufficient time to keep re-calculating the model with different controls.

The present state of the art does not provide for a higher-level criterion that allows easily evaluation of a model and/or forecast quality; nor is there such a statistic that would formalize the model quality criteria, such that an automatic evaluation is possible.

In addition, because of this absence of a reliable, simple, and easy-to-understand model quality indicator, automation of decision-making regarding the quality of models using the present state of the art is complicated and/or of questionable accuracy.

SUMMARY OF THE INVENTION

The present invention enables integration of the computation for statistical modeling and forecasting by automatically evaluating model quality through an unbiased and flexible criterion.

The present invention enables an unbiased, objective and deterministic criterion that allows a user such as an analyst or a computer program automatically performing data analysis, modeling, or forecasting to quickly evaluate model quality and a model's adequacy for a specified task.

Embodiments include generating a forecast model from collected data, combining multiple model-quality parameters based on the model, computing an indication based on the combination of parameters, and evaluating the model and forecast quality based on the indication.

Other embodiments include combining multiple model-quality parameters into a single higher-level indicator and allowing the user to tune the process so as to take into consideration only parameters that are relevant to the user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
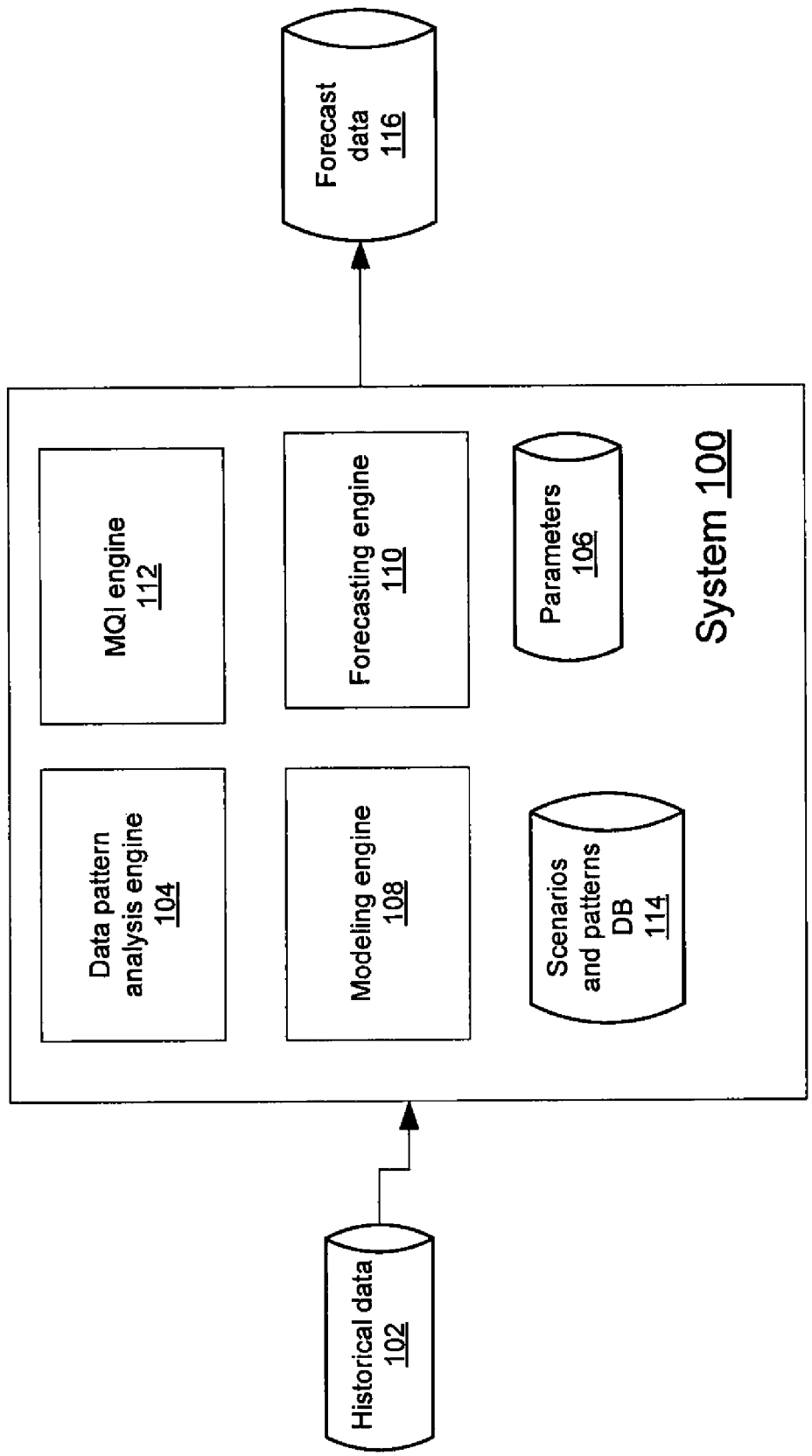
FIG. 1 illustrates a system for modeling and forecasting according to one embodiment of the present invention.

FIG. 1 illustrates a system 100 for performing modeling and forecasting of data in accordance with an embodiment of the present invention. System b00 includes a data analysis engine 104, a parameters database 106, a modeling engine 108, a forecasting engine 110, a model quality index (MQI) engine 112, and a scenarios and patterns database 114. The operation of each of these elements is described further below.

System 100 receives as input time-series data 102, i.e. a sequence of numbers corresponding to data collected from a system of interest during a time period. Data pattern analysis engine (DPA) 104 analyzes this historical data 102 in order to find and interpolate outliers, identify trends in the data, de-trend the data, and find seasonality in the data. DPA 104 then provides this information to modeling engine 108, which in turn generates a forecasting model based on the provided data from DPA engine 104. The model is then provided to forecasting engine 110, in order to generate forecast data 116, which can then be provided to a user. Modeling engine 108 and forecasting engine 110 in one embodiment are the Forecast Pro product, available from Business Forecast Systems, Inc.; in an alternative embodiment they are the Autobox system, available from AFS Inc.

Figure 2:
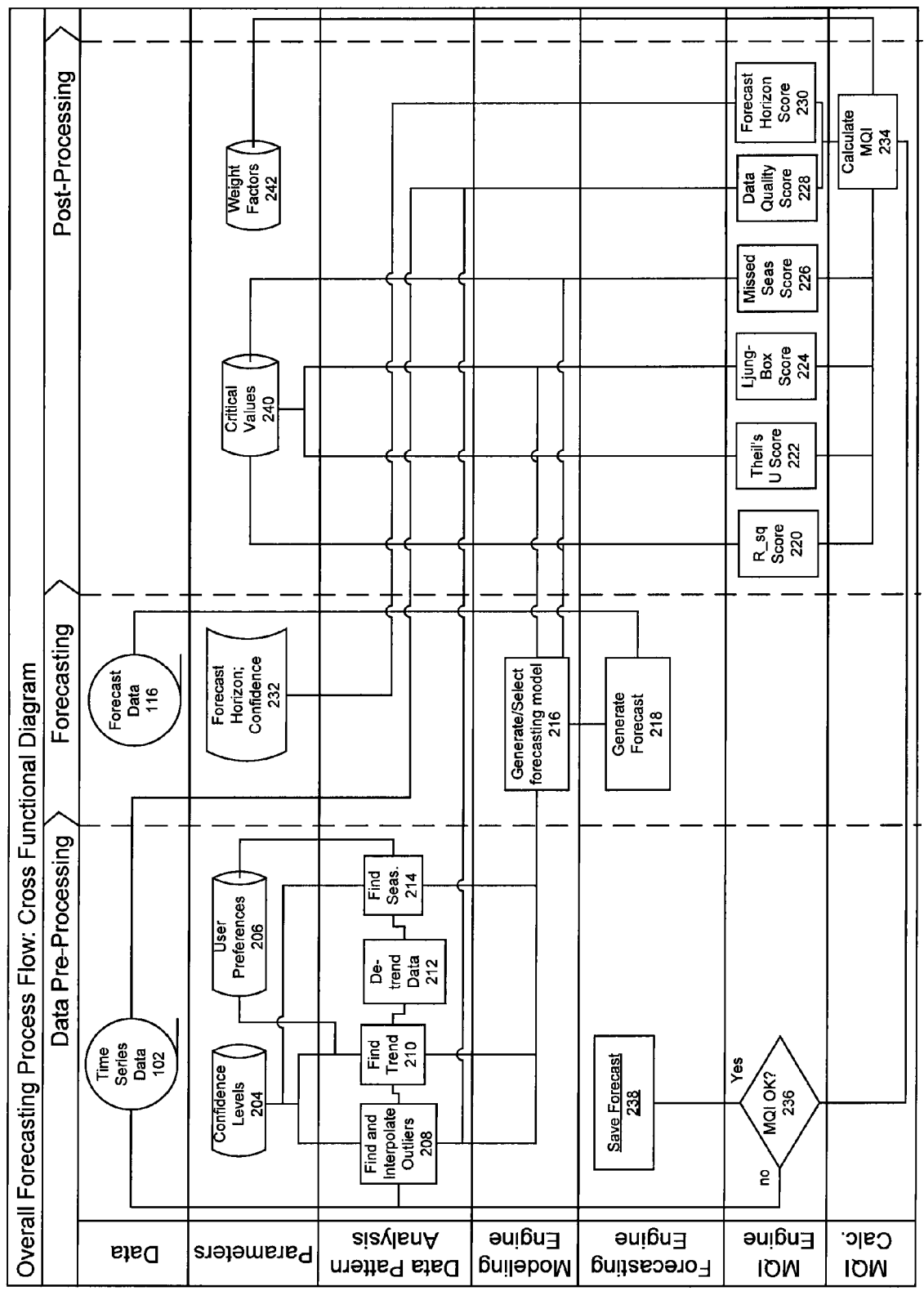
FIG. 2 is a cross-functional diagram indicating a method of operation of a system in accordance with an embodiment of the present invention.

FIG. 2 is an interaction diagram that illustrates a method for evaluating data models and forecasts in accordance with an embodiment of the present invention. Time series data 102 is provided as an input to DPA engine 104, to modeling engine 108, and to MQI engine 112. DPA engine 104 uses the time series data 102, provided confidence levels 204 and user preferences 206, to find and interpolate 208 outliers; find 210 trends in the data; de-trend 212 the data; and find 214 seasonality in the data. The output of DPA engine 104 is then provided to modeling engine 108 so that a model can be generated.

One example of a data analysis engine 104 is described further in Provisional Patent Application 60/805,728 titled "Method And Algorithm For Data Pattern Analysis" filed on Jun. 23, 2006; and in patent application Ser. No. 11/823,108 titled "Data Pattern Analysis" filed on Jun. 25, 2007. Both applications are incorporated by reference herein in their entirety.

Using the trend and seasonality data received from DPA engine 104, modeling engine 108 generates 216 a forecasting model. The forecasting model is then used by forecasting engine 110 to generate 218 a forecast 116.

As described further below, the model generated by modeling engine 108 is also provided to MQI engine 112. MQI engine 112 determines from the model an R_squared score 220, a Thiel's U score 222, Ljung-Box score 224 and missed seasonality score 226. Using those scores as well as a data quality score 228 (based upon DPA engine 104 output and the original data 102) and a forecast horizon score 230 (based upon a specified forecast horizon and confidence interval 232), MQI engine 112 calculates 234 a model quality index (MQI). If 236 the MQI is above a specified threshold, then forecasting engine 110 saves 236 the forecast. Alternatively, if 236 the MQI is not above the specified threshold, then the forecast data 116 is discarded, confidence levels 204, user preferences 206, forecast horizon, critical values 240 or weight factors 242 are adjusted (either automatically or by a user), and the process is restarted until a model having a sufficient MQI can be generated.

In an alternative embodiment, DPA engine 104 is omitted from system 100, and time series data 102 is provided directly to a user, who in turn provides the model parameters and patterns to modeling engine 108.

In addition, in one embodiment, the data, along with the value of the MQI, may be presented to the user. Alternatively, the data may be saved in database 114, with or without any decision-making based on the value of the MQI.

In one embodiment, the MQI can then be quantized to a level such as Poor, Good, or Excellent, instead of being reported as a specific number.

As noted above, after a forecasting model has been calculated, a variety of model-quality related parameters are produced. Model parameters that are used in one embodiment include Sample Size, Forecast Horizon, Model Trend, Seasonality, Theil's U, and $R^2$. If the sample size is insufficient to support the desired confidence limits, the model is not a good one. It is appropriate not to trust time-series-analysis-based forecasts for horizons exceeding the available data sample size. If there is a trend in residuals (differences between the model and the actual data, i.e. model errors), that means the model missed a trend and if, on the other hand, the residuals are random, that means the trend that the model has picked up was adequate. If the model missed any seasonal variation in data, it may impact the model suitability for the task at hand. Theil's U is the criterion used when the question to be answered is whether the model is better for forecasting than the baseline (typically, a simple moving-average extrapolation is used). If a model does not explain significant amount of data variance, as indicated by $R^2$, it is not a good model.

A seasonality may be defined as any periodic variation in data. Data may have multiple (e.g. data representing the amount of a resource used might exhibit both weekly and monthly periodic variations) a single seasonality, or no seasonality at all.

Certain model statistics indicate how good the model was in matching the seasonality inherent in the data, and in one embodiment, the MQI engine 112 uses these statistics as a component of the MQI.

A detailed description of the $R^2$ scoring methodology is described in Provisional Patent Application 60/805,728 titled "Method And Algorithm For Data Pattern Analysis" filed on Jun. 23, 2006; and in patent application Ser. No. 11/823,108 titled "Data Pattern Analysis" filed on Jun. 25, 2007, and earlier incorporated here by reference. Using such an $R^2$ scoring system, system 100 can then formally evaluate the "goodness-of-fit" of the model to the data.

MQI engine 112 calculates the impact of each of the parameters on MQI based on their specifics and then rolls them all up into their combined weighted sum, such that the total becomes the single-number MQI.

Determination of MQI

In one embodiment, the following equations are used in calculating MQI:

$$\text{MQI} = \text{DataEvalScore} + \text{StatEvalScore} \quad (1),$$

where $$\text{DataEvalScore} = W1 * \text{SampleSizeScore} + W2 * \text{ForecastHorizonScore} \quad (2),$$

$$\text{StatEvalScore} = W3 * \text{ModelTrendScore} + W4 * \text{SeasonalityScore} + W5 * \text{RSqScore} + W6 * \text{TheilsUScore} \quad (3),$$

and W1 ... W6 are weight factors.

$$SampleSizeScore = (SSA-SSM)/SSA, \quad (4)$$

SSA=actual sample size;
SSM=minimum sample size based on the desired confidence levels.

$$ForecastHorizonScore = (MFH-DFH)/MFH, \quad (5)$$

MFH=maximum reliable forecast horizon;
DFH=desired forecast horizon.

$$ModelTrendScore = (ChiSqCrit-Q)/Q, \quad (6)$$

ChiSqCrit=the $\chi^2$ critical value for the given number of degrees of freedom,
Q=Ljung-Box Q-statistic.
If Q=0.0, then the ModelTrendScore should be assigned a substitute value, which is preferably a sizable negative number.
SeasonalityScore=NoMSScore if no seasonality has been missed,
SeasonalityScore=−NMS if a seasonality has been missed,
NoMSScore=the score (positive) awarded for the model that did not miss any seasonality.
NMS=number of missed seasonalities.

$$RSqScore = SRSq/MaxScore, \quad (7)$$

SRSq=the score for the model's $R^2$—fraction of the data variance explained by the model.

$$TheilsUScore = (Umax-U)/U, \quad (8)$$

UMax=1.0,
U=the Theil's U2 value—an indicator of how much better the model is than the so-called "naïve" or "random-walk forecast".
If U=0.0, then TheilsUScore is preferably assigned a substitute value, which should be a reasonable positive number.

By combining the scores into one, the MQI is built. The resulting numeric value can then be divided into a qualitative measure such as "Poor", "Good", or "Very Good".

Model Quality Index is calculated using the equations provided above on the output statistics supplied—explicitly or implicitly—by the model. Once calculated, it can be used for analysis of overall scenario quality, comparison of models, or tuning the model parameters.

For the analysis of overall scenario quality (Poor, Good, or Very Good), MQI values that would correspond to a transition from one to the other would require tuning. In one embodiment, the weights are tuned so that MQI<0 indicates a poor model; MQI 0 indicates a Good or Very Good model. For comparison of models, MQI values can be used directly, e.g. the model with a higher MQI would be better.

The present invention can be used in an application involving planning of storage capacity. When planning for additional storage purchase, whether the planning is done interactively or automatically, financial decisions need to be made, based on the forecasts. In such a case, an objective is to determine how much capacity will be needed in the future, and when that need will arise. The MQI is used in one embodiment to judge whether or not the model can be trusted in making financial decisions related to the scheduling of capital expenditures for purchasing more storage. Thus, poor models are not to be taken into consideration, whereas the storage analyst can decide when to expand storage capacity based on good and excellent models.

For higher granularity, a quantitative value of the Model Quality Index is used to tune the model and, where appropriate, to choose a better model.

MQI can also be monitored, as a change in the MQI value typically indicates a change in model parameters or a change in the behavior patterns of the data. When analyzing the future storage usage and utilization, MQI is used to alert users to such changes.

In one embodiment, a different set of parameters may be picked for model quality evaluation. In another embodiment, different formulae for calculation of the effect of each parameter may be used. In one embodiment, weights may be tuned to different transitional values. In one embodiment, the $R^2$ scoring system may use different scales (non-proportional) for scoring the model's goodness-of-fit, which may or may not be beneficial, depending on the data behavior.

One advantage of the Model Quality Index is in the method of its construction. The Model Quality Index is not only extensible (as long as the analyst has another measurable parameter and knows how much weight this parameter has in the overall quality of the scenario, it becomes easy to expand the overall Index), but also flexible (if a parameter is irrelevant—e.g., the analyst does not care about the forecasting capability of the model, it is easy enough to set its weight factor to zero and thus exclude it from consideration).

This Index significantly reduces the number of indicators that the analyst needs to look at to make a judgment call. It also reduces the ramifications of situations where parameters may conflict with each other, since conflicting parameters simply cancel each other, bringing the MQI value closer to zero, driving the Model Quality Index into the neutral zone.

Finally, the Model Quality Index can be used in an automatic mode to quickly and easily compare large numbers of models for the same data and/or for a variety of data and select the best, or discard the worst, model(s) for every specific case, without human intervention.

Thus the Model Quality Index described herein provides an effective method that can be used in analysis of data and models, gauging data quality and model adequacy for the task at hand.

Other applications of the Model Quality Index (outside the storage capacity planning) include, but are not limited to: academic studies of forecasting and modeling, business forecasting applications, identifying process limitations in statistical process control, or analysis and modeling of computer operation parameters such as CPU utilization and memory usage.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the modeling engine 108 and forecasting engine 110, and so forth may be provided in many or one module.

Some portions of the above description present the feature of the present invention in terms of algorithms and symbolic representations of operations on information. These algorithmic descriptions and representations are the means used by those skilled in the art of data modeling and forecasting to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A system for integrating the computation for statistical modeling and forecasting, the system comprising:
a computer system comprising computer hardware, the computer system programmed to implement:
a data pattern analysis engine configured to:
receive collected data related to computer storage capacity,
detect any trend in the collected data, and
detect any seasonality in the data;
a forecast engine configured to select a forecast model adapted to predict an amount of additional computer storage capacity to obtain in the future and when to obtain the additional computer storage capacity, the forecast model operative to select the forecast model based at least partly on any said outliers found, any said trend detected, and any said seasonality;
a model quality engine configured to:
calculate a model quality index, the model quality index reflecting a quality of the forecast model, wherein said calculation by the model quality engine comprises:
calculating a plurality of model-quality indicators by at least analyzing the forecast model, said model-quality indicators comprising two or more of the following: an $R^2$ goodness of fit, a Theil's U score, a Ljung-Box score, a missed seasonality score, a data quality score, a forecast horizon score, and a sample size, and
combining the plurality of model-quality indicators into a weighted sum to produce the model quality index; and
adjust one or more parameters of the forecast model based at least in part on a value of the model quality index, said one or more parameters of the forecast model comprising a confidence level, a user preference, a forecast horizon confidence, a critical value, and one or more weight factors.

2. The system of claim 1, wherein the model quality engine is further configured to compare the model quality index to a threshold.

3. The system of claim 2, wherein the model quality engine is further configured to adjust the one or more parameters of the forecast model responsive to said comparison.

4. A method for integrating the computation for statistical modeling and forecasting, the method comprising:
by a computer system comprising computer hardware:
generating a forecast model from collected data, the forecast model adapted to predict an amount of additional computer storage capacity to obtain in the future and when to obtain the additional computer storage capacity, said generating the forecast model comprising:
finding and interpolating any outliers in the collected data,
detecting any trend in the collected data,
detecting any seasonality in the data, and
generating the forecast model based at least partly on any said outliers found, any said trend detected, and any said seasonality detected;
calculating a model quality index, the model quality index reflecting a quality of the forecast model, said calculating comprising:
calculating a plurality of model-quality indicators by at least analyzing the forecast model, said model-quality indicators comprising a goodness of fit, a missed seasonality score, and a sample size, and combining the plurality of model-quality indicators into a weighted sum to produce the model quality index; and adjusting one or more parameters of the forecast model to predict storage capacity based at least in part on a value of the model quality index, said one or more parameters of the forecast model comprising a confidence level, a user preference, a forecast horizon confidence, a critical value, and one or more weight factors.

5. The method of claim 4, further comprising comparing the model quality index to a threshold.

6. The method of claim 4, wherein said adjusting is performed responsive to said comparison.

7. The method of claim 4, wherein weights of the weighted sum are tuned to different transitional values.

8. The method of claim 4, wherein weights of the weighted sum are user-adjustable.

9. The method of claim 4, further comprising outputting an indication to the user of model quality, the indication reflecting the model quality index.

10. The method of claim 9, wherein said indication is quantized to a level selected from the group consisting of poor, good, and excellent.

11. The method of claim 4, wherein said adjusting comprises tuning the model by considering one or more parameters of the forecast model selected by a user.

12. A computer-readable medium having computer program instructions configured to implement a method of statistical modeling and forecasting, method comprising:

by a computer system comprising computer hardware:

generating a forecast model from collected data related to computer storage capacity, the forecast model adapted to predict an amount of additional computer storage capacity to obtain in the future and when to obtain the additional computer storage capacity;

calculating a model quality index, the model quality index reflecting a quality of the forecast model, said calculating comprising calculating a plurality of model-quality indicators, said model-quality indicators comprising two or more of the following: an $R^2$ goodness of fit, a Theil's U score, a Ljung-Box score, a missed seasonality score, a data quality score, a forecast horizon score, and a sample size; and adjusting one or more parameters of the forecast model to predict storage capacity based at least in part on the model quality index, said one or more parameters of the forecast model comprising one or more of the following: a confidence level, a user preference, a forecast horizon confidence, and a critical value.

13. The computer-readable medium of claim 12, further comprising comparing the model quality index to a threshold.

14. The computer-readable medium of claim 12, wherein said adjusting is performed responsive to said comparison.

15. The computer-readable medium of claim 12, wherein calculating the model quality index comprises calculating a weighted combination of one or more of the model-quality indicators.

16. The computer-readable medium of claim 15, wherein weights of the weighted combination are tuned to different transitional values.

17. The computer-readable medium of claim 15, wherein weights of the weighted combination are user-adjustable.

18. The computer-readable medium of claim 12, further comprising outputting an indication to the user of model quality, the indication reflecting the model quality index.

19. The computer-readable medium of claim 18, wherein said indication is quantized to a level selected from the group consisting of poor, good, and excellent.

20. The computer-readable medium of claim 12, wherein said adjusting comprises tuning the model by considering one or more parameters of the forecast model selected by a user.

21. The method of claim 4, wherein said model quality indicators further comprise one or more of the following: a Theil's U score, a Ljung-Box score, a data quality score, and a forecast horizon score.

22. The computer program product of claim 12, wherein the forecast model is generated by at least:

finding and interpolating any outliers in the collected data;
detecting any trend in the collected data; and
detecting any seasonality in the data.

* * * * *